(12) United States Patent
Seebach et al.

(10) Patent No.: US 12,409,514 B2
(45) Date of Patent: Sep. 9, 2025

(54) METHOD FOR LASER WELDING TWO COATED WORKPIECES

(71) Applicant: TRUMPF Laser- und Systemtechnik GmbH, Ditzingen (DE)

(72) Inventors: Johannes Seebach, Stuttgart (DE); Nicolai Speker, Pleidelsheim (DE); Adrian Wolf, Leonberg (DE); Tim Hesse, Ditzingen (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 634 days.

(21) Appl. No.: 17/899,633

(22) Filed: Aug. 31, 2022

(65) Prior Publication Data

US 2023/0001513 A1    Jan. 5, 2023

Related U.S. Application Data

(63) Continuation of application No. PCT/EP2021/053305, filed on Feb. 11, 2021.

(30) Foreign Application Priority Data

Mar. 2, 2020 (DE) .................. 10 2020 105 505.6

(51) Int. Cl.
*B23K 26/322* (2014.01)
*B23K 26/06* (2014.01)
(Continued)

(52) U.S. Cl.
CPC ........ *B23K 26/322* (2013.01); *B23K 26/0604* (2013.01); *B23K 26/0626* (2013.01);
(Continued)

(58) Field of Classification Search
CPC ............... B23K 26/322; B23K 26/244; B23K 26/0604; B23K 26/0626; B23K 26/073;
(Continued)

(56) References Cited

U.S. PATENT DOCUMENTS 6,646,225 B1 * 11/2003 Wang ................. B23K 26/0608
219/121.64
2004/0200813 A1    10/2004 Alips et al.
(Continued)

FOREIGN PATENT DOCUMENTS

CN      110369868 A  * 10/2019  ............. B23K 26/60
DE       10309157 A1    9/2004
(Continued)

*Primary Examiner* — Eric S Stapleton
*Assistant Examiner* — Yeong Juen Thong
(74) *Attorney, Agent, or Firm* — LEYDIG, VOIT & MAYER, LTD.

(57) ABSTRACT

A method for laser welding two coated workpieces includes positioning an upper workpiece and a lower workpiece on top of each other and passing a first laser beam over the upper and lower workpieces from a side of the upper workpiece so as to at least partially evaporate the respective coating of each of the workpieces on their facing sides along a depletion trace. A second laser beam is passed over the workpieces from the side of the upper workpiece so as to melt a material of the two workpieces within the depletion trace, and thereby weld the workpieces to one another. In the first laser passing, the first laser beam melts the material of the upper workpiece, so that a web of non-melted material of the upper workpiece remaining between the melted material of the upper workpiece and the facing side of the upper workpiece.

17 Claims, 7 Drawing Sheets

(51) Int. Cl.
  *B23K 26/073*  (2006.01)
  *B23K 26/244*  (2014.01)
  *B23K 101/00*  (2006.01)
  *B23K 101/18*  (2006.01)
  *B23K 101/34*  (2006.01)
  *B23K 103/04*  (2006.01)

(52) U.S. Cl.
  CPC ........ *B23K 26/073* (2013.01); *B23K 26/0734* (2013.01); *B23K 26/244* (2015.10); *B23K 2101/006* (2018.08); *B23K 2101/18* (2018.08); *B23K 2101/34* (2018.08); *B23K 2103/04* (2018.08)

(58) Field of Classification Search
  CPC ............ B23K 26/0734; B23K 2101/18; B23K 2103/04; B23K 2101/34; B23K 2101/006
  USPC ...................... 219/121.61, 125.1, 124.1, 123
  See application file for complete search history.

(56) References Cited

U.S. PATENT DOCUMENTS

| | | |
|---|---|---|
| 2006/0144826 A1 | 7/2006 | Becker et al. |
| 2013/0223792 A1 | 8/2013 | Huber et al. |
| 2019/0118307 A1 | 4/2019 | Wang et al. |
| 2020/0316713 A1* | 10/2020 | Yang ................. B23K 26/0736 |

FOREIGN PATENT DOCUMENTS

| | | | |
|---|---|---|---|
| DE | 102010003750 A1 | 8/2013 | |
| FR | 2790689 A1 | 9/2000 | |
| JP | H04231190 A | 8/1992 | |
| JP | 2002160083 A | 6/2002 | |
| JP | 2002178178 A | 6/2002 | |
| JP | 2002219590 A | 8/2002 | |
| JP | 2003094184 A | 4/2003 | |
| JP | 2008126241 A | 6/2008 | |
| JP | 2009050894 A | 3/2009 | |
| WO | 03031111 A1 | 4/2003 | |
| WO | 2007060479 A1 | 5/2007 | |
| WO | WO-2017173650 A1 * | 10/2017 | ............. B23K 26/26 |

* cited by examiner

METHOD FOR LASER WELDING TWO COATED WORKPIECES

CROSS REFERENCE TO RELATED APPLICATIONS

This application is a continuation of International Application No. PCT/EP2021/053305 (WO 2021/175555 A1), filed on Feb. 11, 2021, and claims benefit to German Patent Application No. DE 10 2020 105 505.6 filed on Mar. 2, 2020. The aforementioned applications are hereby incorporated by reference herein.

FIELD

The invention relates to a method for laser welding two coated workpieces, in particular steel sheets coated with zinc, an upper workpiece and a lower workpiece being positioned one on top of the other, with, in a first method step, a laser beam being passed over the workpieces positioned one on top of the other from the side of the upper workpiece, and the coating of the workpieces on their facing sides at least partially evaporating along a depletion trace, and with, in a second method step, a laser beam again being passed over the workpieces positioned one on top of the other from the side of the upper workpiece, and the material of the two workpieces being melted within the depletion trace, as a result of which the workpieces are welded to one another.

BACKGROUND

Such a method has been disclosed by DE 103 09 157 A1, for example.

Welding is a joining method which enables two workpieces to be permanently connected to one another. Laser welding is usually used if the intention is to carry out welding at a high welding speed, with a narrow and slender weld seam shape and with low thermal warpage. During laser welding, energy is fed in via a laser beam.

In many cases, the workpieces to be welded to one another are coated, for example in order to protect the workpieces against corrosion. In the automotive field, bodywork parts of sheet steel as base material are often coated with zinc, for example.

In the event of laser welding coated workpieces, however, defects often arise (for instance pores and spatter) at the weld seam if the material of the coating has such a low evaporation point that it evaporates at the temperature required for welding the base material of the workpieces. Primarily critical is coating material which becomes involved in the welding process at the joint of workpieces positioned overlapping on one another (lying one on top of the other). Suddenly evaporating coating material in the melt pool creates welding spatter and can result in holes or porosity in the weld seam (what is referred to as the "melt pool effect"). In addition, a coating material gas flow can flow at high pressure from the joint into a vapor capillary of the welding process and press against the back wall of the vapor capillary, and thus distend the vapor capillary of the welding process (what is known as the "balloon effect"); this can likewise generate spatter and tunnel-like pores.

A measure for reducing defects caused by coatings on workpieces is, during the laser welding, not to position the workpieces one on top of the other but rather to arrange them spaced apart one above the other. However, this requires complex preparation when the workpiece is being positioned, and can create surface defects in the form of indentations.

To reduce defects in the weld seam when laser welding two plates positioned one on the other as far as possible without a gap, DE 103 09 157 A1 proposes using a laser beam first of all in a first method step to heat the coated plate facing the laser beam, with the result that the coating of the plates on their facing sides evaporates, with neither of the plates melting. In a second method step, the two plates can be welded in the region in which the coating has been removed. In this context, the same laser beam is used in the first and the second method step, with use being made of a respectively identical power and focusing but a different advancement speed.

In the case of this procedure, the quality of the weld seam can be improved, but this method is relatively slow. In addition, having the same laser beam travel over the weld seam multiple times at different advancement speeds is expensive and complicated to carry out.

Various methods for laser welding coated workpieces have also been disclosed in JP 2003 094 184 A, JP 2002 178 178 A, JP 2002 219 590 A, JP 2009 050 894 A, WO 2007/060479 A1, WO 03/031 111 A1, JP 2002 160 083 A and JP H04 231 190 A.

DE 10 2010 003 750 A1 discloses altering the beam profile characteristic of a laser beam by means of a multiclad fiber.

SUMMARY

In an embodiment, the present disclosure provides a method for laser welding two coated workpieces that includes positioning an upper workpiece and a lower workpiece on top of each other and passing a first laser beam over the upper and lower workpieces from a side of the upper workpiece so as to at least partially evaporate the respective coating of each of the workpieces on their facing sides along a depletion trace. A second laser beam is passed over the workpieces from the side of the upper workpiece so as to melt a material of the two workpieces within the depletion trace, and thereby weld the workpieces to one another. In the first laser passing, the first laser beam melts the material of the upper workpiece, so that a web of non-melted material of the upper workpiece remaining between the melted material of the upper workpiece and the facing side of the upper workpiece.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
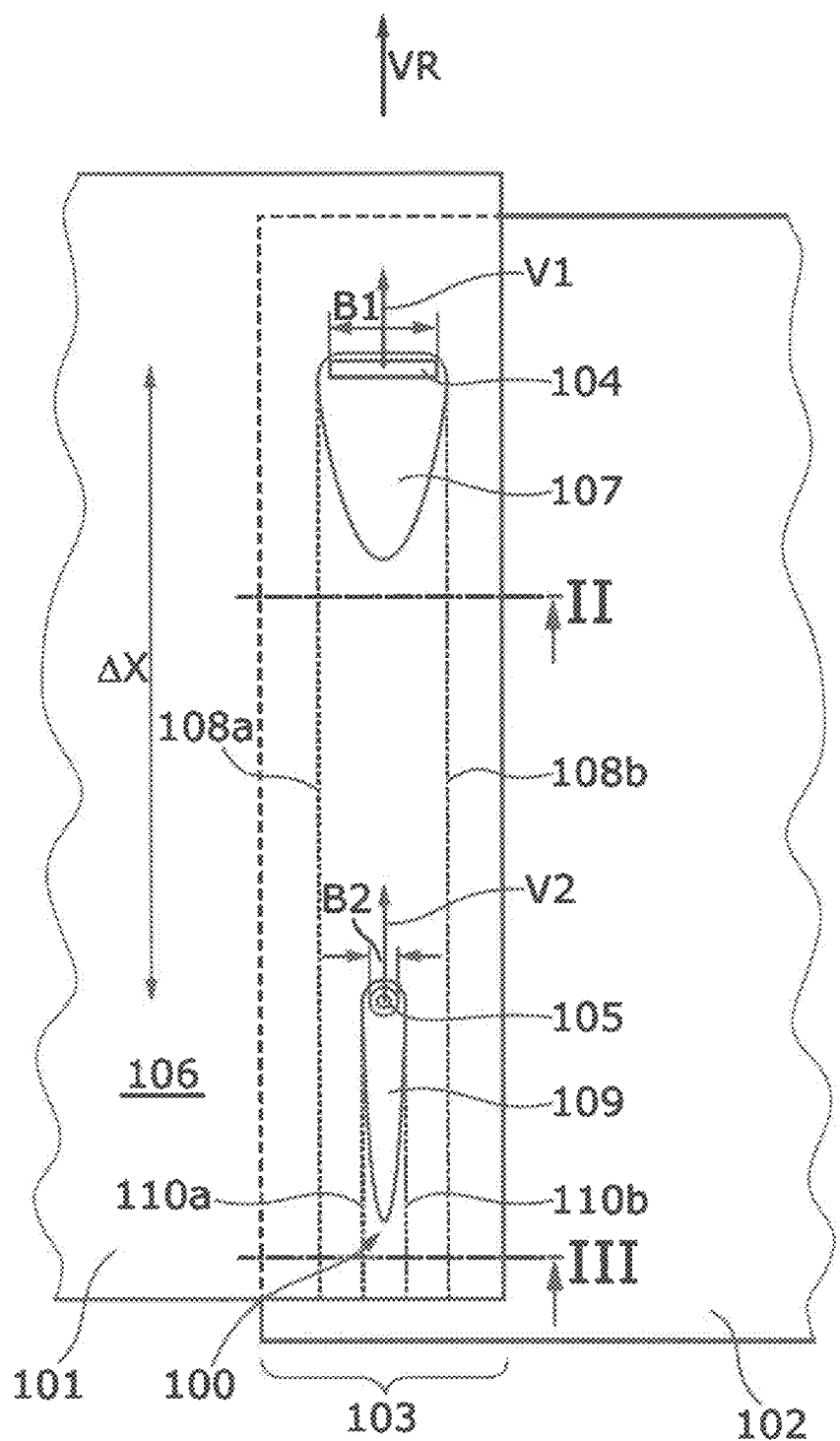
FIG. 1 shows a schematic plan view of two workpieces positioned one on top of the other during an exemplary variant of the method according to the invention.

The object of the invention is to provide a method for laser welding coated workpieces that are positioned one on top of the other, by means of which method a high quality of the weld seam can be achieved and which method can be carried out more quickly and easily.

This object is achieved according to the invention by means of a method of the type mentioned in the introduction which is distinguished by the fact that, in the first method step, the material of the upper workpiece is melted by the laser beam, with a web of non-melted material of the upper workpiece remaining between the melted material of the upper workpiece and the side of the upper workpiece that faces the lower workpiece.

In the context of the present invention, it is provided not just to heat the upper workpiece that faces the laser beam in the first method step, but also to melt it over part of its depth. This makes it possible to introduce the heat required to at least partially evaporate the coating at the joint of the overlapping workpieces positioned one on top of the other more quickly than when merely effecting heating without (even just partially) melting the upper workpiece in the course of the first method step. Correspondingly, in the first method step, higher advancement speeds are possible, and the method can be carried out more quickly overall.

During the first method step, a web of non-melted material of the upper workpiece that consists of the base material of the workpiece remains, and therefore, in the first method step, the melt pool of the laser beam does not come into contact with the coating material at the joint of the two workpieces. This avoids a situation in which evaporating coating material from the joint is introduced in the depth of the melt pool or else into a vapor capillary during the first method step. Correspondingly, spatter formation caused by the coating material does not occur.

In the first method step, the coating material from the joint is at least partially, and preferably virtually completely, evaporated over the width of a depletion trace by the heat of the laser beam. The evaporated coating material can in particular escape laterally outward along the joint of the workpieces. In the subsequent second method step, when the laser beam or a vapor capillary of the welding process also penetrates the lower workpiece through the depletion trace, only a little or even virtually almost no coating material from the joint enters the melt pool or the vapor capillary, as a result of which spatter or pores on account of evaporating coating material are effectively avoided. The quality of the final weld seam that can be achieved is correspondingly high.

During the laser welding method according to the invention, during both the first method step and the second method step the two workpieces are positioned one on top of the other, and are in direct contact with one another in an overlapping region, in particular over their surface area. For this purpose, the two workpieces are typically clamped onto one another or pressed against one another during the first and the second method step, and typically the workpieces lie one on top of the other virtually without a gap. It should be noted that coating material that even in that case has evaporated (is gaseous) at the joint can flow along the joint, and in particular can flow out laterally. In particular, the two workpieces are not kept spaced apart one above the other during the first and the second method step.

If desired, the laser beam of the first method step ("first laser beam") and/or the laser beam of the second method step ("second laser beam") may undergo beam shaping, for instance by a multiclad fiber and/or a diffractive optical element, in order to obtain a specific geometric configuration of the laser beam. In particular for the first laser beam, a configuration with an aspect ratio ASP (ratio of the greatest width transversely with respect to the advancement direction to the greatest extent in the advancement direction) of ASP≥2, or even ASP≥4, is preferred, it being possible in particular to set approximately a linear shape, rectangular shape or an elliptical shape. In particular for the second laser beam, the application of beam shaping by means of a core focus portion and (at least) one ring focus portion (with a lower power density in the ring focus portion than in the core focus portion) has proven successful.

Typically, both the first method step and the second method step are carried out as deep welding operations (with creation of a vapor capillary). In the first method step, it is in turn possible for heat to be introduced into the joint particularly quickly in this respect. In the second method step, it is possible also for heat to be introduced for melting purposes into the material of the second workpiece particularly quickly. For method steps in deep welding mode, the respective laser beam can advantageously be configured by means of a core focus portion and (at least) one ring focus portion, in order to increase the processing speed. The ring focus portion and core focus portion usually have a circular cross section; however, it is also possible to set up other annular geometries (for instance rectangular-annular geometries), in particular for the first laser beam, if a high aspect ratio is desired.

The laser welding method according to the invention can be performed by passing the two laser beams of the first and second method steps over the workpieces to be welded once.

The two coated workpieces are typically galvanized steel sheets. However, it is also possible to use other material combinations for the workpieces, in particular for which the evaporation temperature of the material of the coating is lower than the melting temperature of the base material of the workpieces. The workpieces typically have a thickness of 0.5-2.5 mm, usually 0.75-1.5 mm. Coatings of the workpieces typically have a thickness of 10 μm to 200 μm.

Preferred Variants of the Method According to the Invention

In a preferred variant of the method according to the invention, the first method step and the second method step take place at the same time at different locations on the workpieces positioned one on top of the other, the laser beam of the first method step leading the laser beam of the second method step. This makes it possible for the method to be carried out particularly quickly.

A further development of this variant in which the laser beam of the first method step and the laser beam of the second method step have the same advancement speed is advantageous. This can be carried out particularly easily; in that case, laser optical units for the first and the second laser beam can be moved together relative to the workpieces.

A variant, in which the material of the first workpiece that was melted in the first method step is solidified again at least on the workpiece surface if the second method step takes place later at the same location, is preferred. This makes it possible to improve control of the method sequence and to achieve a higher quality of the weld seam. The solidified surface of the melt pool after the first method step ensures continuous calming of fluctuations in the melt pool, before the second method step begins. Correspondingly, the setup of the second method step primarily defines the melt pool dynamics during the second method step.

A variant, in which the material of the first workpiece that was melted in the first method step is completely solidified again if the second method step takes place later at the same location, is likewise preferred. This likewise makes it possible to improve control over the method sequence and to achieve a higher quality of the weld seam. The completely solidified melt pool after the first method step ensures continuous calming of fluctuations in the melt pool, before the second method step begins. Correspondingly, essentially only the setup of the second method step defines the melt pool dynamics during the second method step. Furthermore, it is always the "full" enthalpy of melting that is expended to create the melt pool in the second method step or to progress it, thereby likewise improving control over the method sequence.

Particularly preferred is a variant in which, in the first method step, the material of the upper workpiece is melted to a great enough extent that, for a maximum melting depth AT of the melted material of the upper workpiece in comparison with the thickness DW of the upper workpiece, the following applies:

$$60\% \leq AT/DW \leq 95\%,$$

preferably $70\% \leq AT/DW \leq 90\%$.

These melting depths allow heat to readily access the joint, in order to bring about evaporation of the coating at the joint or on the facing sides of the workpieces in the depletion trace. In the case of conventional workpiece thicknesses, as a safeguard, the remaining height of the web is enough to avoid coating material accessing the melt pool or a vapor capillary in the first method step.

Particularly preferred is a variant in which, for a maximum width B1 of the laser beam in the first method step and a maximum width B2 of the laser beam in the second method step, in each case measured transversely with respect to the advancement direction and on the surface of the upper workpiece, the following applies:

$$B1 \geq 2*B2,$$

preferably $B1 \geq 3*B2$, particularly preferably $B1 \geq 5*B2$. A comparatively wide laser beam of the first method step makes it possible firstly to create a correspondingly wide depletion trace, in particular compared to the width of the later fusion zone of the workpieces. In addition, a large width of the first laser beam and a correspondingly wider distribution of the laser power radiated in reduces the risk of penetration occurring with the melt pool as far as the joint of the workpieces in the first method step, in particular in the event of inhomogeneities in the workpiece or at the joint. At the same time, the creation of a (sufficiently wide) depletion zone is highly reliable, with the result that the introduction of coating material from the joint in the second method step can similarly be reliably prevented.

Also preferred is a variant which provides that, for an average laser power P1 of the laser beam in the first method step and an average laser power P2 of the laser beam in the second method step, the following applies:

$$P1 \geq 1.5*P2,$$

preferably $P1 \geq 3*P2$. The comparatively high laser power P1 of the first laser beam makes it possible to introduce a lot of energy into the first workpiece or into the joint in a short time, with the result that the coating material in the joint can evaporate in a short time, and correspondingly high advancement speeds in the first method step are possible. It will be noted that the (average) power density of the first laser beam is typically considerably lower than the (average) power density of the second laser beam, typically by a factor of 2 or more, usually by a factor of 4 or more.

In an advantageous variant, for a focal position F1 of the laser beam of the first method step and a focal position F2 of the laser beam of the second method step, the following applies:

$$F1 < F2,$$

preferably $F1 < F2 \leq 0$. This has proven successful in practice in order, in the method, to bring about a favorable distribution of the laser power radiated in, and in particular in order to set the formation and depth of the vapor capillaries in the two method steps. A negative focal position indicates that the focus is below the workpiece surface of the upper workpiece (that is to say in the workpiece).

Particularly preferred is a variant in which, for a width BE of the depletion trace on the facing sides of the workpieces after the first method step and a width BNK of the melted material in a joint plane of the facing sides of the two workpieces after the second method step, in each case measured transversely with respect to an advancement direction, the following applies:

$$BE \geq 2*BNK,$$

preferably $BE \geq 3*BNK$. With these relationships, the introduction of coating material into the melt pool in the second method step can be minimized and this can also be ensured with high reliability in the event of inhomogeneities, and correspondingly it is possible to achieve a very good quality of the weld seam.

Furthermore advantageous is a variant in which the laser beam of the first method step and/or the laser beam of the second method step is a reshaped laser beam and comprises a core focus portion and at least one ring focus portion, the core focus portion and the ring focus portion being coaxial with one another and the ring focus portion surrounding the core focus portion. This beam shaping has proven successful to avoid weld seam defects, both in the first method step but also and primarily in the second method step, in particular in deep welding mode. This beam shaping makes it possible to achieve calming of the melt pool dynamics, which, together with the avoidance according to the invention of the introduction of coating material from the joint into the melt pool ensures especially high quality of the weld seam and the same time allows a quick method sequence (in particular at high advancement speed in the two method steps). This variant is preferably applied for laser beams reshaped with a circular cross section, but can also be applied for non-circular, reshaped laser beams, for example rectangular, reshaped laser beams.

In this respect, particularly preferred is a further development which provides that the reshaped laser beam is created by means of a multiclad fiber, a first part of the raw laser beam being fed into a core fiber of the multiclad fiber and at least one second part of the raw laser beam being fed into a ring fiber of the multiclad fiber at an input end, the ring fiber surrounding the core fiber, and the reshaped laser beam being obtained at an output end of the multiclad fiber. In this way, beam shaping can be comparatively easily carried out using a ring focus portion and a core focus portion, and in addition the division between these two portions (provided it is necessary) can be altered relatively easily or the respective welding task can be adapted by altering the division of the raw laser beam between the first part and the second part.

Particularly preferred is a variant in which the laser beam of the first method step and the laser beam of the second method step are created using different laser sources, and are directed onto the workpieces positioned one on top of the other using different laser optical units, in particular with the two laser optical units being arranged at a fixed distance in relation to one another. In this variant, it is especially easily possible to independently select or set the laser power and the beam shaping of the first and the second laser beam, and in addition it is easily possible to apply the first and the second laser beam at the same time and independently. Arranging the laser optical units at a fixed distance easily makes it possible also to set up a fixed distance between the processing zones of the two laser beams on the workpieces positioned one on top of the other. In this instance, laser source means a structural unit composed of laser medium, pump and laser resonator.

Furthermore advantageous is a variant in which the workpieces positioned one on top of the other are welded by full penetration welding in the second method step. This makes it possible firstly to achieve a particularly fixed connection between the workpieces, and secondly makes it possible to feed in a filler wire from below, if desired.

A preferred variant of the method according to the invention provides that the workpieces are galvanized steel sheets with a thickness DW, with 0.5 mm≤DW≤1.8 mm, preferably 0.7 mm≤DW≤1.5 mm, that an average laser power P1 of the laser beam in the first method step is selected with 6 kW≤P1≤20 kW, preferably 8 kW≤P1≤16 kW, and an average laser power P2 of the laser beam in the second method step is selected as 3 kW≤P2≤6 kW, that a maximum width B1 of the laser beam of the first method step and a maximum width B2 of the laser beam of the second method step on the surface of the upper workpiece, in each case measured transversely with respect to the advancement direction, are selected with 2.5 mm≤B1≤5 mm and 0.25 mm≤B2≤0.75 mm, that an advancement speed V1 of the laser beam of the first method step and an advancement speed V2 of the laser beam of the second method step are selected with V1≥4 m/min and V2≥4 m/min, preferably V1≥6 m/min and V2≥6 m/min, particularly preferably with V1=V2 and 6 m/min≤V1≤20 m/min and 6 m/min≤V2≤20 m/min, and that a spatial distance ΔX between the laser beams of the first and the second method step is selected with ΔX≥50 mm and/or an interval time TP between the action of the laser beams of the first and the second method step is selected with TP≥0.50 s. In practice, these parameters have led to welded connections with a high weld seam quality.

The use of a method according to the invention that was described above for welding motor vehicle bodywork components also falls within the scope of the present invention. In other words, the two workpieces (in the course of or after being welded) are installed in the bodywork of a motor vehicle. In motor vehicles, coated metal sheets for which a good weld seam quality is desired, this weld seam quality being readily achievable by the present invention, are frequently used for corrosion protection purposes.

Further advantages of the invention will become apparent from the description and the drawing. Likewise, according to the invention, the features mentioned above and those that will be explained still further can be used in each case individually by themselves or as a plurality in any desired combinations. The embodiments shown and described should not be understood as an exhaustive enumeration, but rather are of illustrative character for outlining the invention.

FIG. 1 shows a schematic plan view of the laser welding of two coated workpieces 101, 102 according to an exemplary variant of the method according to the invention.

The workpieces 101 and 102 are positioned one on top of the other, i.e. lie directly one on top of the other, in an overlap region 103. In the variant shown, the workpiece 101 is arranged at the top, and the workpiece 102 is arranged at the bottom (and correspondingly shown partially in dashed lines, where it is overlapped by the upper workpiece 101). In the overlapping region 103, the two workpieces are in mutual contact over their surface areas (touching contact); the workpieces are typically mechanically clamped (pressed) onto one another throughout the method (not shown in any more detail, but cf. FIG. 4 in this respect). The two workpieces 101, 102 are in the form of zinc-coated steel sheets in this instance (cf. FIG. 2 and FIG. 3 in this respect), which are to be installed in a bodywork of a motor vehicle. The workpieces 101, 102 are welded to one another along an advancement direction VR using two laser beams 104, 105, which are directed onto the workpiece surface 106 of the upper workpiece 101. The laser beams 104, 105 move in the advancement direction VR relative to the workpieces 101, 102 along a (planned) weld seam 100 in the overlap region 103.

In a first method step, first of all the upper workpiece 101 is irradiated with the laser beam 104 (first laser beam), which is at the front with respect to the advancement direction VR, in the overlap region 103. The first laser beam 104 has a width B1 on the workpiece surface 106 and in this instance has an approximately rectangular cross section (on the workpiece surface 106) and has an aspect ratio ASP of approximately ASP=6.5 in this instance; the width B1 of the first laser beam 104 transversely with respect to the advancement direction VR is greater than its extent in the advancement direction here. Behind it, the first laser beam 104 creates a trail-like melt pool 107 of liquid, melted workpiece material. Behind the melt pool 107, the workpiece material is completely solidified again within the boundaries of two external weld seam edges 108a, 108b.

In a second method step, the upper workpiece 101 is then irradiated with the laser beam 105 (second laser beam), which is at the rear with respect to the advancement direction VR, in the overlap region 103, which laser beam has a width B2 on the workpiece surface 106 and in this instance has an approximately circular cross section (on the workpiece surface 106). In this respect, in the variant shown, it approximately holds true that B1=3.5*B2, the widths being measured transversely with respect to the advancement direction VR on the workpiece surface 106. The second laser beam 105 in this instance has a core focus and a ring focus that surrounds it (for more detail in this respect, see FIGS. 5-7). Behind it, the second laser beam 105 in turn creates a trail-like melt pool 109 of liquid, melted workpiece material. Behind the melt pool 107, the workpiece material is completely solidified again within the boundaries of two internal weld seam edges 110a, 110b.

The weld seam 100 of the two workpieces 101, 102 that is to be welded is passed over in each portion by the two laser beams 104, 105 in succession, in the exemplary variant shown the two laser beams 104, 105 (provided the end of the weld seam 100 has not been reached) being applied at the same time and having the same advancement speed V1=V2, and correspondingly having a constant distance ΔX (measured from center to center of the laser beams 104, 105 on the workpiece surface 106) in relation to one another along the weld seam 100. In the variant shown, this distance ΔX is large enough that the second laser beam 105 always penetrates workpiece material that has completely solidified again, i.e. the two melt pools 107, 109 are separate from one another. For this purpose, the distance ΔX is typically greater than 50 mm. An interval time is therefore provided between the two laser processing operations of the first method step and of the second method step, which interval time allows the workpieces to cool down in the meantime; a typical interval time is 0.5 seconds or more.

Figure 2:
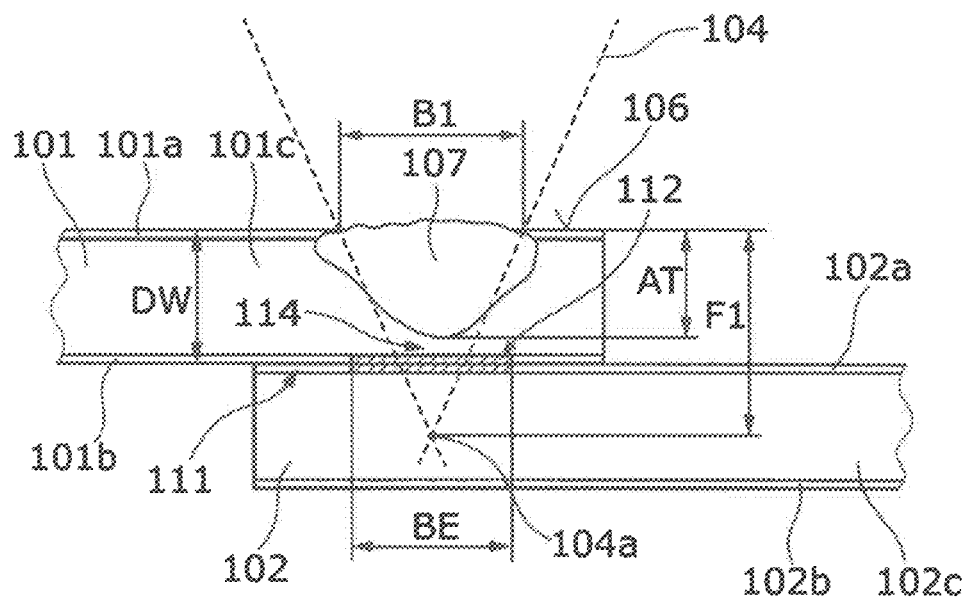
FIG. 2 shows a schematic cross-sectional view of the workpieces of FIG. 1 through the sectional plane II of FIG. 1, after the first method step.

FIG. 2 shows a schematic cross section (perpendicularly with respect to the advancement direction) through the workpieces 101, 102 of FIG. 1 at plane II, that is to say after the first method step.

For each of the workpieces 101, 102, coatings 101a, 102a on the respective top side, coatings 101b, 102b on the respective bottom side, and basic bodies 101c, 102c, to which the coatings 101a, 101b, 102a, 102b are applied can readily be seen in the cross section. The basic bodies 101c, 102c are manufactured from steel, and the coatings 101a, 101b, 102a, 102b from zinc. In the variant shown, the workpieces 101, 102 have similar forms, in particular with the same thickness DW.

The first laser beam 104 (depicted as a dashed line, because it lies behind the plane of the drawing) has a negative focal position F1 with respect to the workpiece surface 106, with its focus 104a in the bottom half of the lower workpiece 102 in this instance. The first laser beam 104 has melted the workpiece material in the region of the melt pool 107 (which in this instance has solidified again). The melt pool 107 extends only in the upper workpiece 101 and has a (maximum) melting depth AT which in this instance is approximately 75% of the thickness DW of the upper workpiece 101. A web 114 of material of the first workpiece 101 that was not melted by the first laser beam remains between the melt pool 107 and the bottom side of the upper workpiece 101.

The heating of the upper workpiece 101 by the first laser beam 104 has also resulted in a depletion trace 112 (marked by hatching) being produced at the joint 111 of the workpieces 101, 102, which is the contact region of the facing sides of the workpieces 101, 102 positioned one on top of the other and resting on one another, in which depletion trace the material of the coatings 101b and 102a has at least partially, preferably completely, evaporated and escaped from the joint 111. The depletion trace 112 has a width BE, it holding true in this instance approximately that BE=0.9*B1. In general, it preferably holds true that BE≥0.5*B1.

Figure 3:
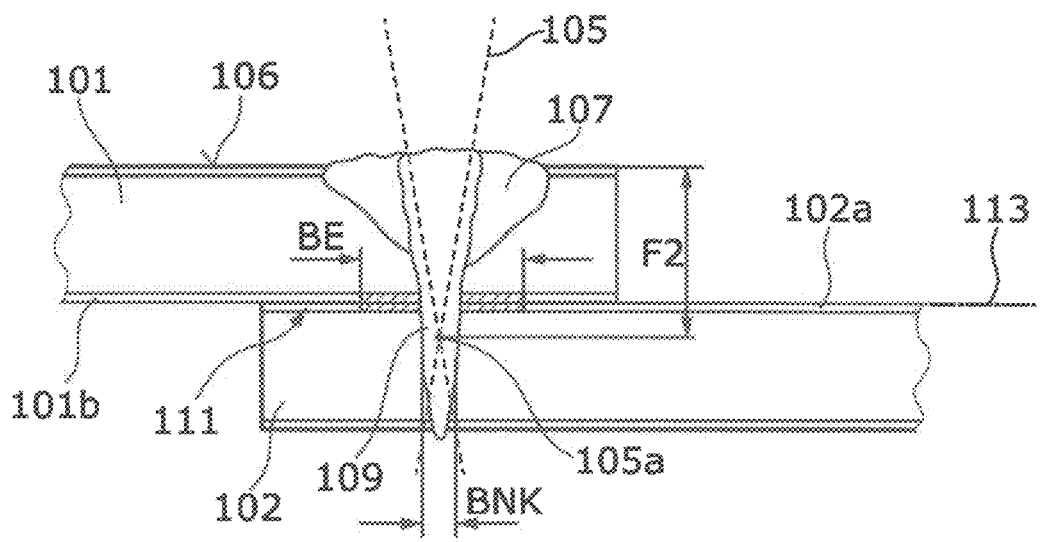
FIG. 3 shows a schematic cross-sectional view of the workpieces of FIG. 1 through the sectional plane III of FIG. 1, after the second method step.

FIG. 3 shows a schematic cross section (perpendicularly with respect to the advancement direction) through the workpieces 101, 102 of FIG. 1 at plane III, that is to say after the second method step.

The second laser beam 105 (depicted as a dashed line, because it lies behind the plane of the drawing) likewise has a negative focal position F2 with respect to the workpiece surface 106, with its focus 105a in the top half of the lower workpiece 102 in this instance. The focal position F2 of the second laser beam 105 thus lies somewhat further upward (closer to the workpiece surface 106) than the focal position F1 of the first laser beam 104. The second laser beam 105 has melted the workpiece material in the region of the melt pool 109 (which in this instance has solidified again). The melt pool 109 extends completely through the upper workpiece 101 and in this instance also completely through the lower workpiece 102, corresponding to full penetration welding.

For a width BNK of the melted material of the (solidified) melt pool 109 in the joint plane 113 of the joint 111, it holds true here approximately that BNK=0.33*BE. In general, it preferably holds true that BNK≤0.5*BE. The melt pool 109 lies in the region of the joint 111, that is to say within the depletion trace 112, with the result that no material or only very little material of the coatings 101b, 102a enters the melt pool 109 or even a vapor capillary (not illustrated) created in the second method step using the second laser beam 105. This avoids defects at the weld seam caused by abruptly evaporating material of the coatings 101b, 102a.

Figure 4:
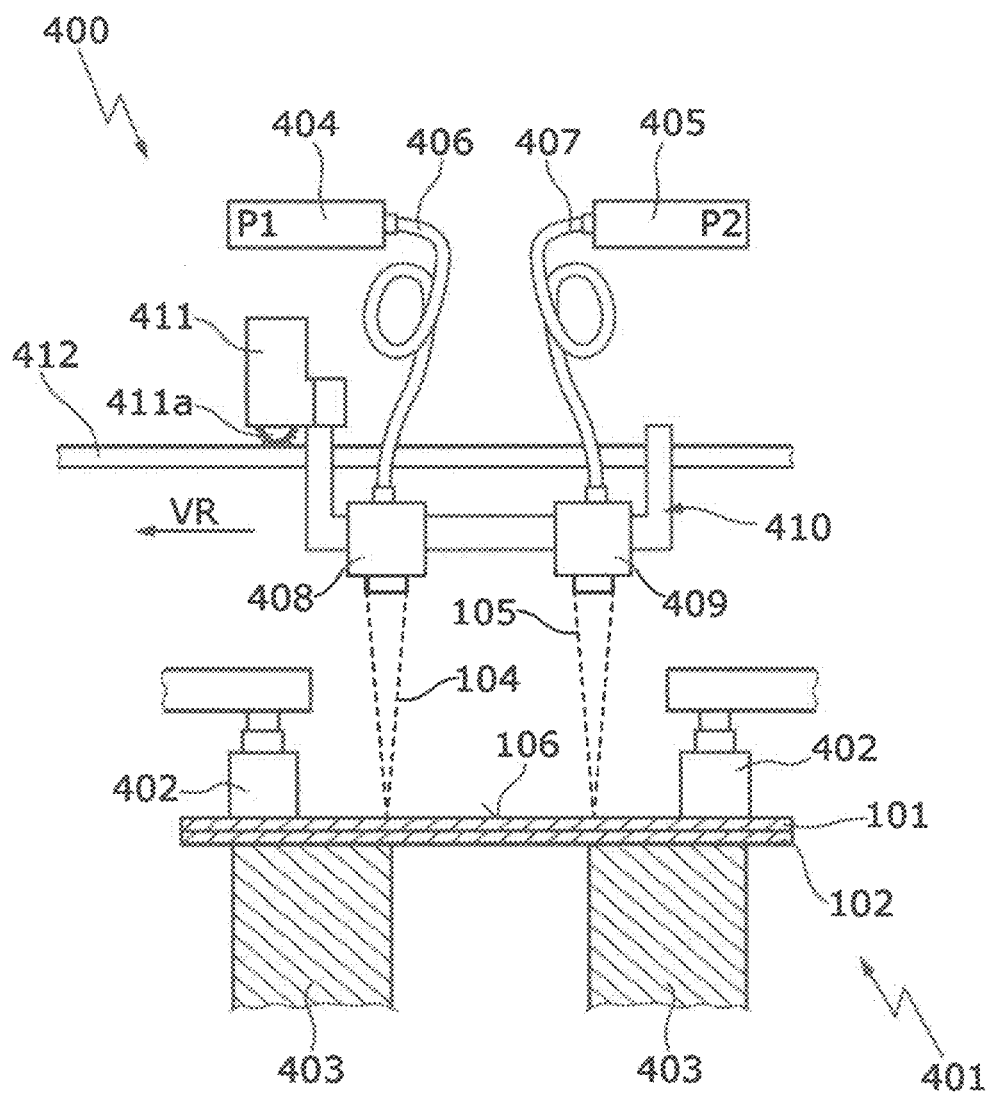
FIG. 4 shows a schematic side view of an installation for carrying out the laser welding method according to the invention.

FIG. 4 shows a schematic side view of an exemplary installation 400 for carrying out a welding method according to the invention.

Two workpieces 101, 102, which in this instance are sheet-like, are positioned one on top of the other and are pressed onto one another using a clamping system 401, in this instance comprising movable press punches 402 and supports 403, in order to obtain approximately gap-free mutual contact over their surface area. The workpieces 101, 102 are welded to one another along an advancement direction VR using a first laser beam 104 and a second laser beam 105 (cf. also FIGS. 1-3 in this respect).

The first laser beam 104 for the first method step is created by a first laser source 404, and the second laser beam 105 for the second method step is created by a separate second laser source 405; the laser sources 404, 405 each have a laser resonator, laser medium and pump (not illustrated in more detail). In the variant shown, the first laser source has a power P1 and the second laser source has a power P2, in this instance with P1=3*P2; however, other variants are also possible, for example also with P1=P2. The laser light generated in the respective laser source 404, 405 is in each case conducted by way of a flexible light guide 406, 407 to a respective laser optical unit 408, 409, which then directs the respective laser beam 104, 105 onto the (upper) workpiece surface 106 of the upper workpiece 101. Depending on the usage situation, respective beam shaping may be provided for the laser beams 104, 105, for instance set up by the light guides 406, 407 (also see FIGS. 5-7 in this respect)

and/or the laser optical units 408, 409, which may contain diffractive optical elements (not illustrated in more detail), for example.

The two laser optical units 408, 409 in this instance are fixedly arranged on a common mount 410, which can be moved parallel to the advancement direction VR on a guide 412 by means of a motorized drive 411. Correspondingly, the two laser optical units 408, 409 are at a fixed distance in relation to one another with respect to the advancement direction VR. In this instance, the guide 412 is formed with a toothset (not illustrated in more detail) for the engagement of a toothed wheel 411a of the motorized drive 411. By moving the common mount 410 on the guide 412, the laser beams 104, 105 can be moved together with respect to the (in this instance stationary) workpieces 101, 102, in order to set up the advancement of the welding processes.

Figure 5:
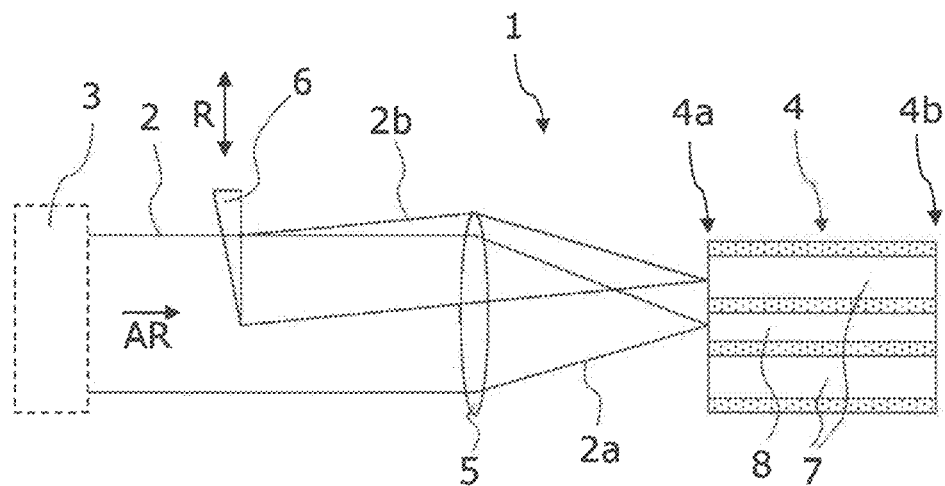
FIG. 5 shows a schematic view of an apparatus for reshaping a raw laser beam, for the invention.

FIG. 5 schematically illustrates an exemplary apparatus 1, which can be used for beam shaping within the scope of the present invention for the first and/or the second laser beam (see FIGS. 1-4).

A laser source 3 generates a raw laser beam 2, which in this instance is directed via a focusing lens 5 onto the input end 4a of a multiclad fiber 4, here a 2 in 1 fiber; cf. the propagation direction AR. The multiclad fiber 4 serves as a light guide.

A first part 2a of the cross section of the raw laser beam 2 is fed into a core fiber 8 of the multiclad fiber 4 without deflection. By means of a wedge plate 6, a second part 2b of the cross section of the raw laser beam 2 is deflected and fed into a ring fiber 7 of the multiclad fiber 4.

In the multiclad fiber 4, the laser power of the two parts 2a, 2b is distributed uniformly in each case in the course of advancing in the ring fiber 7 and in the core fiber 8; it should be noted that the length of the multiclad fiber 4 is illustrated in a shortened manner in FIG. 5. At an output end 4b of the multiclad fiber 4, a reshaped laser beam is provided (not illustrated in more detail, but cf. FIG. 6 and FIG. 7 in this respect); the reshaped laser beam is typically imaged onto the workpieces to be welded via a lens system, usually comprising a collimation lens and a focusing lens (likewise not illustrated in more detail).

For setting the parts 2a, 2b or the power proportions for the core focus portion and the ring focus portion, the wedge plate 6 here can be moved in the direction R transversely with respect to the propagation direction AR.

Figure 6:
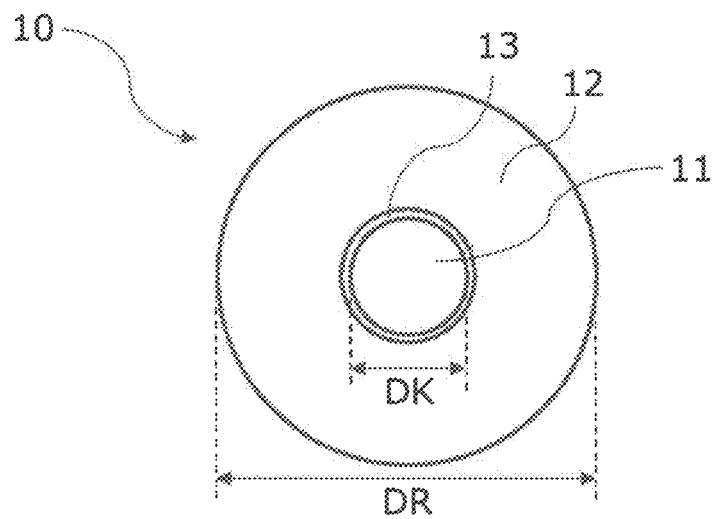
FIG. 6 shows a schematic cross section of a reshaped laser beam, for the invention.

FIG. 6 illustrates the beam cross section of the reshaped laser beam 10 such as can be observed for example at the workpiece surface of the irradiated upper workpiece. The reshaped laser beam 10 has a core focus portion 11 surrounded coaxially by a ring focus portion 12. A region 13 with lower laser intensity typically lies between the core focus portion 11 and the ring focus portion 12. In this instance, the diameter DR of the ring focus portion 12 is approximately 3.5 times the diameter DK of the core focus portion 11; it preferably holds true that $2 \leq DR/DK \leq 5$.

Figure 7:
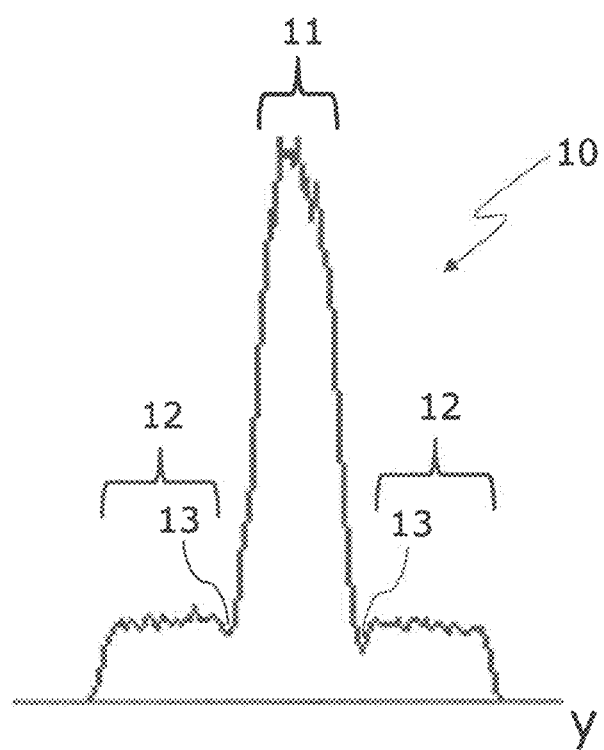
FIG. 7 shows a schematic intensity distribution of a reshaped laser beam, along a direction y transversely with respect to the propagation direction of the reshaped laser beam.

FIG. 7 illustrates a typical intensity distribution of the reshaped laser beam 10 in cross section along a direction y leading through the center of the cross section of the reshaped laser beam 10; the local laser intensity is plotted upward, and the location along the direction y toward the right.

Within the core focus portion 11 the laser power is approximately constant, typically with a fluctuation of a maximum of 25% around the average value in the core focus portion 11. Likewise, the laser power in the region of the ring focus portion 12 is approximately constant, typically likewise with a fluctuation of a maximum of 25% around the average value in the ring focus portion. It is readily discernible in the diagram that the (average) intensity of the reshaped laser beam 10 in the region of the core focus portion 11 is significantly greater than that in the region of the ring focus portion 12, here approximately 8 times greater. With the geometry present here, approximately 50% of the total laser power is allotted to the core focus portion 11, and the remainder, here likewise approximately 50% of the total laser power, is allotted to the ring focus portion. Preferably, between 45% and 85% of the total laser power of the laser beam is allotted to the core focus portion.

It should be noted that a plurality of concentric ring focus portions can also be provided in the beam cross section of the reshaped laser beam, in particular by a multiclad fiber with two or more ring fibers being used for the reshaping (not illustrated in more detail).

Figure 8:
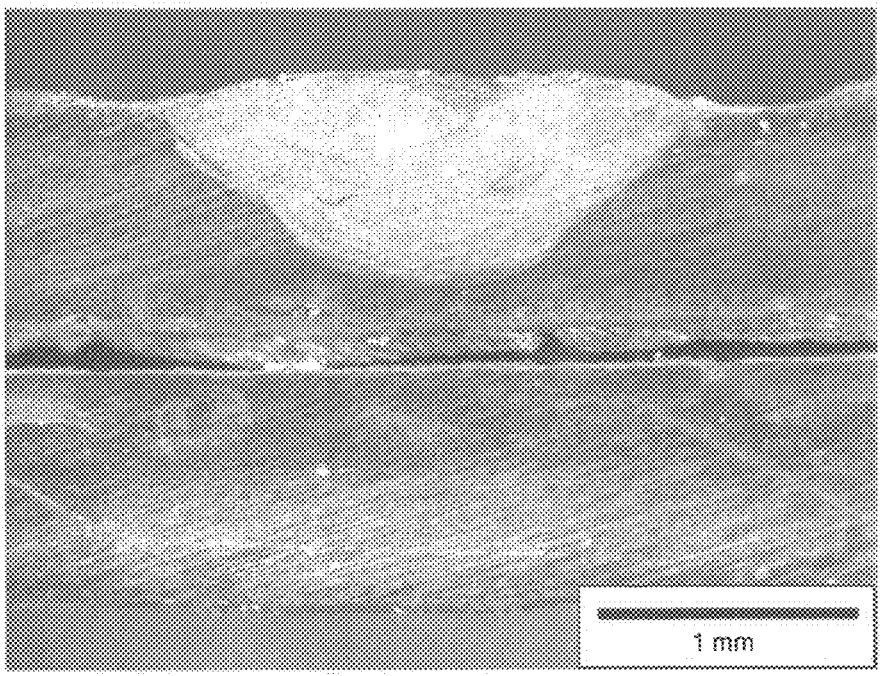
FIG. 8 shows a light-optical recording, from an experiment, of a polished section of workpieces that were welded as per one variant of the method according to the invention, after the first method step.
Figure 9:
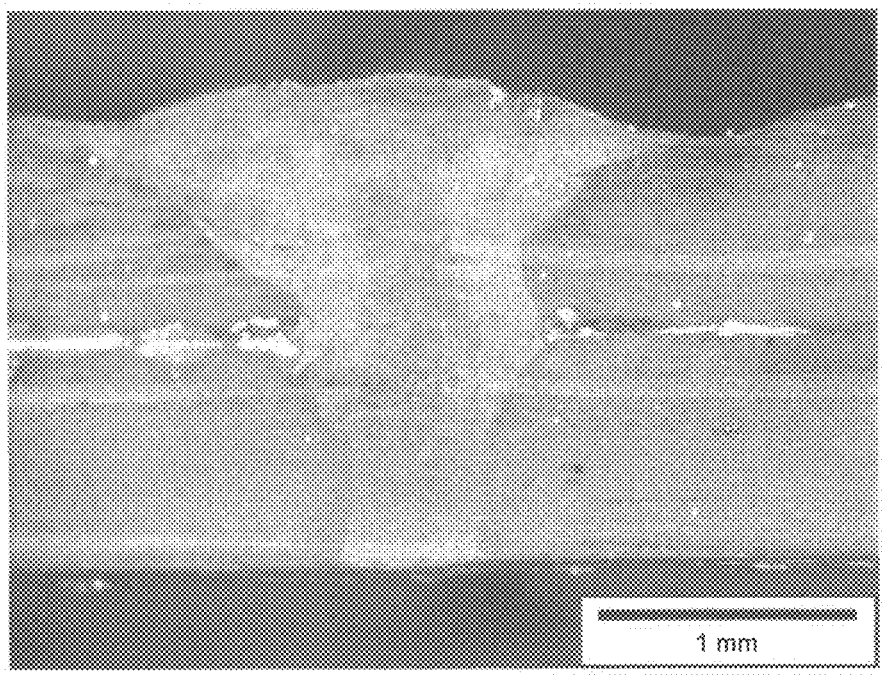
FIG. 9 shows a light-optical recording, from an experiment, of a polished section of the workpieces of FIG. 8 that were welded as per one variant of the method according to the invention, after the second method step.
Figure 10A:
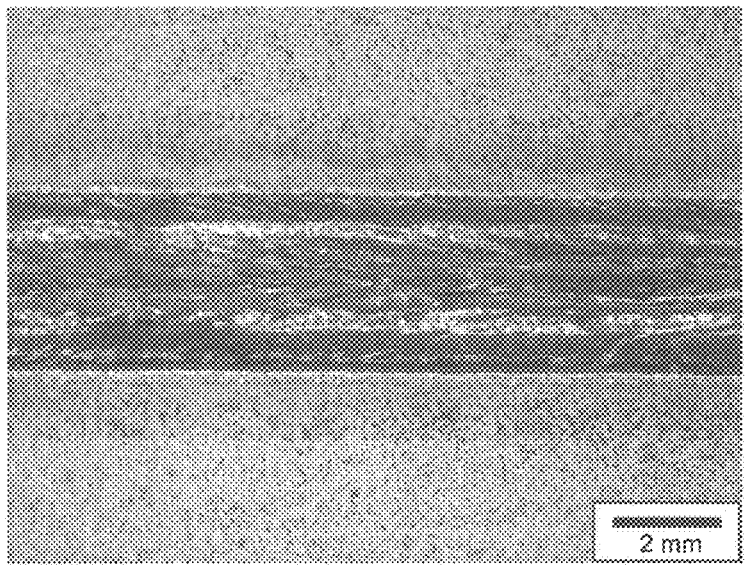
FIGS. 10(a) and 10(b) show light-optical recordings, from an experiment, in a plan view from above (image at the top, marked 10(a)) and from below (image at the bottom, marked 10(b)) of the final weld seam of the workpieces of FIG. 9.
Figure 10B:
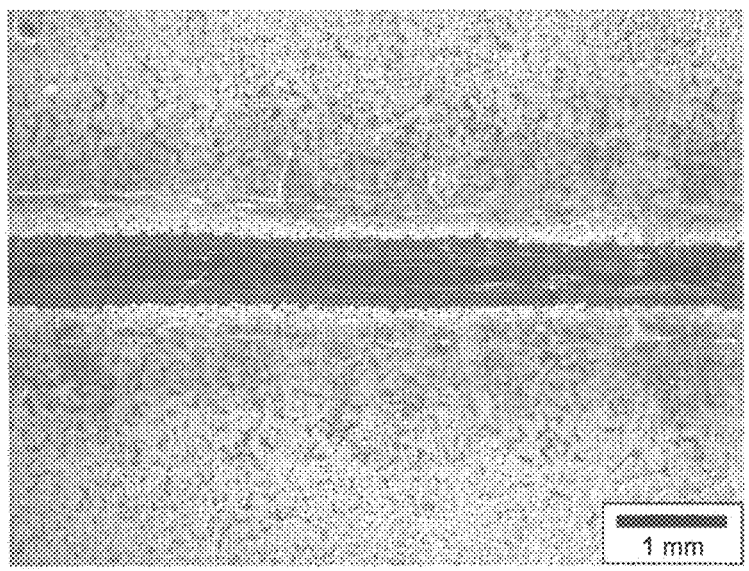

FIG. 8 and FIG. 9 each show a light-optical recording, from an experiment, of a polished section of two workpieces that were welded according to the invention, in a state after the first method step in FIG. 8 and after the second method step in FIG. 9. The workpieces each had a thickness of approximately 1 mm and were manufactured from sheet steel as basic body and provided with a zinc coating on both sides. In the first method step, a rectangular laser beam with a width B1 of 2.95 mm was applied, the laser power amounted to 6 kW, and the advancement speed 4.2 m/min. In the second method step, a circular laser beam reshaped by a 2 in 1 fiber and having a width B2 of 0.44 mm (ring focus 0.44 mm, core focus 0.11 mm, power proportion of the core focus 70%) was applied, the laser power amounted in turn to 6 kW, and the advancement speed 12 m/min. FIG. 10 shows light-optical recordings in a plan view of the finished weld seam from above (image at the top, marked a) and from below (image at the bottom, marked b).

In the first method step, the upper workpiece was melted over approximately 80% of its thickness, but the joint was not reached, in keeping with the invention. Full penetration welding was carried out in the second method step. The finished weld seam is very uniform both on the top side and on the bottom side, and despite the comparatively high advancement speed in the first method step there was virtually no welding spatter, and no porosity can be seen in the solidified melt pool of the finished weld seam.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Apparatus
2 Raw laser beam
2a First part (raw laser beam)
2b Second part (raw laser beam)
3 Laser source
4 Multiclad fiber
4a Input end
4b Output end
5 Focusing lens
6 Wedge plate
7 Ring fiber
8 Core fiber
10 Reshaped laser beam
11 Core focus portion
12 Ring focus portion
13 Region with lower laser intensity
100 Weld seam
101 Upper workpiece
101a Coating (top side of upper workpiece)
101b Coating (bottom side of upper workpiece)
101c Basic body (upper workpiece)
102 Lower workpiece
102a Coating (top side of lower workpiece)
102b Coating (bottom side of lower workpiece)
102c Basic body (lower workpiece)
103 Overlap region
104 (First) laser beam
104a Focus (first laser beam)
105 (Second) laser beam
105a Focus (second laser beam)
106 Workpiece surface
107 Melt pool (created by first laser beam)
108a, 108b Outer weld seam edges
109 Melt pool (created by second laser beam)
110a, 110b Inner weld seam edges
111 Joint
112 Depletion trace
113 Joint plane
114 Web
400 Installation
401 Clamping system
402 Press punch
403 Support
404 Laser source (first laser beam)
405 Laser source (second laser beam)
406, 407 Light guides
408, 409 Laser optical unit
410 Common mount
411 Motorized drive
411a Toothed wheel
412 Guide
AR Propagation direction
AT Melting depth
BE Width of depletion trace
BNK Width of the melted material in the joint plane
B1 Width of first laser beam
B2 Width of second laser beam
F1 Focal position of first laser beam
F2 Focal position of second laser beam
P1 Laser power (first laser beam)
P2 Laser power (second laser beam)
R Direction (transversely with respect to the propagation direction of the raw laser beam)
VR Feed direction
V1 Advancement direction (first laser beam)
V2 Advancement direction (second laser beam)
y Direction (transversely with respect to the propagation direction of the reshaped laser beam)
ΔX Distance between the laser beams

The invention claimed is:

1. A method for laser welding two coated workpieces, comprising:
positioning an upper workpiece and a lower workpiece one on top of the other,
in a first laser passing, passing a first laser beam over the upper and lower workpieces from a side of the upper workpiece so as to at least partially evaporate the respective coating of each of the workpieces on their facing sides along a depletion trace,
and in a second laser passing, passing a second laser beam over the workpieces from the side of the upper workpiece so as to melt a material of the two workpieces within the depletion trace, and thereby weld the workpieces to one another,
wherein,
in the first laser passing, the first laser beam melts the material of the upper workpiece and does not melt through the upper workpiece, so that a web of non-melted material of the upper workpiece remaining between the melted material of the upper workpiece and the facing side of the upper workpiece.

2. The method as claimed in claim 1, wherein the first laser passing and the second laser passing take place at the same time at different locations on the workpieces, the first laser beam leading the second laser beam.

3. The method as claimed in claim 2, wherein the first laser beam and the second laser beam have a same advancement speed.

4. The method as claimed in claim 1, further comprising solidifying at least on a surface of the upper workpiece the material of the upper workpiece that was melted in the first laser passing when the second laser passing takes place later at the same location.

5. The method as claimed in claim 1, further comprising completely solidifying the material of the upper workpiece that was melted in the first laser passing when the second laser passing takes place later at the same location.

6. The method as claimed in claim 1, wherein, in the first laser passing, the material of the upper workpiece is melted to a great enough extent that, for a maximum melting depth AT of the melted material of the upper workpiece in comparison with the thickness DW of the upper workpiece, the following applies:

$$60\% \leq AT/DW \leq 95\%.$$

7. The method as claimed in claim 1, wherein, for a maximum width B1 of the first laser beam and a maximum width B2 of the second laser beam, in each case measured transversely with respect to an advancement direction and on the surface of the upper workpiece, the following applies:

$$B1 \geq 2*B2.$$

8. The method as claimed in claim 1, wherein, for an average laser power P1 of the first laser beam and an average laser power P2 of the second laser beam, the following applies:

$$P1 \geq 1.5 * P2.$$

9. The method as claimed in claim 1, wherein, for a focal position F1 of the first laser beam and a focal position F2 of the second laser beam, the following applies:

$$F1 < F2.$$

10. The method as claimed in claim 1, wherein, for a width BE of the depletion trace on the facing sides of the workpieces after the first laser passing and a width BNK of the melted material in a joint plane of the facing sides of the two workpieces after the second laser passing, in each case measured transversely with respect to an advancement direction, the following applies:

$$BE \geq 2 * BNK.$$

11. The method as claimed in claim 1, wherein the first laser beam and/or the second laser beam is a reshaped laser beam and comprises a core focus portion and at least one ring focus portion, the core focus portion and the ring focus portion being coaxial with one another and the ring focus portion surrounding the core focus portion.

12. The method as claimed in claim 11, wherein the reshaped laser beam is passed through a multiclad fiber, a first part of a raw laser beam being fed into a core fiber of the multiclad fiber and at least one second part of the raw laser beam being fed into a ring fiber of the multiclad fiber at an input end, the ring fiber surrounding the core fiber, and the reshaped laser beam being obtained at an output end of the multiclad fiber.

13. The method as claimed in claim 1, wherein the first laser beam and the second laser beam are created using different laser sources, and are directed onto the workpieces using different laser optical units.

14. The method as claimed in claim 1, wherein the workpieces are welded by full penetration welding in the second laser passing.

15. The method as claimed in claim 1, wherein
the workpieces include galvanized steel sheets with a thickness DW, with 0.5 mm≤DW≤1.8 mm,
that an average laser power P1 of the first laser beam is selected with 6 kW≤P1≤20 kW, and an average laser power P2 of the second laser beam is selected as 3 kW≤P2≤6 kW,
a maximum width B1 of the first laser beam and a maximum width B2 of the second laser beam on the surface of the upper workpiece, in each case measured transversely with respect to the advancement direction, are selected with 2.5 mm≤B1≤5 mm and 0.25 mm≤B2≤0.75 mm,
an advancement speed V1 of the first laser beam and an advancement speed V2 of the second laser beam are selected with V1≥4 m/min and V2≥4 m/min,
and a spatial distance ΔX between the first and second laser beams is selected with ΔX≥50 mm and/or an interval time TP between the action of the first and second laser beams is selected with TP≥0.50 s.

16. The method as claimed in claim 1, wherein upper and the lower workpieces comprise steel sheets coated with zinc.

17. The method as claimed in claim 1, wherein the upper and lower workpieces are motor vehicle bodywork components.

* * * * *